US010703002B2

(12) United States Patent
Bergami

(10) Patent No.: US 10,703,002 B2
(45) Date of Patent: Jul. 7, 2020

(54) CUTTING APPARATUS AND METHOD

(71) Applicant: Sacmi Cooperative Meccanici Imola Societa' Cooperativa, Imola (IT)

(72) Inventor: Stefano Bergami, Castel San Pietro Terme (IT)

(73) Assignee: SACMI Cooperativa Meccanici Imola Societa' Cooperativa (IT)

( * ) Notice: Subject to any disclaimer, the term of this patent is extended or adjusted under 35 U.S.C. 154(b) by 175 days.

(21) Appl. No.: 15/455,245

(22) Filed: Mar. 10, 2017

(65) Prior Publication Data

US 2017/0246755 A1    Aug. 31, 2017

Related U.S. Application Data

(62) Division of application No. 13/508,449, filed as application No. PCT/IB2010/055083 on Nov. 9, 2010, now abandoned.

(30) Foreign Application Priority Data

Nov. 10, 2009  (IT) .............................. MO2009A0269

(51) Int. Cl.
  B26D 3/08    (2006.01)
  B23Q 17/24   (2006.01)
  B26D 7/00    (2006.01)
  B26F 1/18    (2006.01)
  B26D 1/02    (2006.01)
  (Continued)

(52) U.S. Cl.
  CPC .............. *B26D 3/08* (2013.01); *B23Q 17/24* (2013.01); *B23Q 17/2442* (2013.01); *B26D 1/02* (2013.01); *B26D 5/16* (2013.01); *B26D 7/00* (2013.01); *B26F 1/18* (2013.01); *B26D 1/01* (2013.01); *B26F 2210/04* (2013.01); *Y10T 83/04* (2015.04); *Y10T 83/647* (2015.04)

(58) Field of Classification Search
  CPC ............ B23Q 17/2442; B23Q 17/0909; B23Q 17/2409; B23Q 17/2452; Y10T 82/16688; B26F 2210/04; B26F 1/18; B26D 1/01; B26D 1/02; B26D 3/08; B26D 5/16; B67B 3/003
  USPC ......... 53/485–487; 83/411.1, 410.9, 423, 62, 83/62.1
  See application file for complete search history.

(56) References Cited

U.S. PATENT DOCUMENTS 3,861,551 A    1/1975   Hannon
4,185,576 A    1/1980   George
(Continued)

FOREIGN PATENT DOCUMENTS

DE    9010797 U1   9/1990
DE    4232236 A1   4/1993
(Continued)

*Primary Examiner* — Jason Daniel Prone
*Assistant Examiner* — Samuel A Davies
(74) *Attorney, Agent, or Firm* — Laubscher & Laubscher, P.C.

(57) ABSTRACT

In a cutting apparatus a rotating carousel conveys caps made of synthetic plastic material to a fixed blade having the shape of a circumferential arc. The caps are rotated about themselves by spindles. The blade cuts an annular weakening line to form the tamperproof ring of the cap. The carousel has an emitter and a laser receiver that cooperate to detect the presence or absence of the cutting edge of the fixed blade. The apparatus ensures good cutting quality.

6 Claims, 10 Drawing Sheets

(51) Int. Cl.
*B26D 1/01* (2006.01)
*B26D 5/16* (2006.01)

(56) References Cited

U.S. PATENT DOCUMENTS

| | | |
|---|---|---|
| 4,511,054 A | 4/1985 | Shank |
| 4,657,395 A | 4/1987 | Shiraishi et al. |
| 5,438,814 A * | 8/1995 | Lovett .................. B65B 7/2807 53/282 |
| 5,488,888 A * | 2/1996 | Kowal .................... B26D 9/00 215/252 |
| 5,809,860 A | 9/1998 | Haaser |
| 6,142,046 A | 11/2000 | Mierau et al. |
| 6,237,455 B1 | 5/2001 | Mierau et al. |
| 6,576,531 B2 | 6/2003 | Peng et al. |
| 6,698,323 B2 | 3/2004 | Formon et al. |
| 6,857,939 B2 | 2/2005 | Adachi et al. |
| 2007/0092590 A1 | 4/2007 | Bonzi |
| 2007/0217673 A1 * | 9/2007 | Stimpson ........... B23Q 17/2442 382/152 |

FOREIGN PATENT DOCUMENTS

| | | |
|---|---|---|
| EP | 1609570 B1 | 4/2009 |
| JP | 54109682 | 8/1979 |
| JP | 62006114 A | 1/1987 |
| WO | 2004004993 A1 | 1/2004 |

* cited by examiner

CUTTING APPARATUS AND METHOD

This application is division of application Ser. No. 13/508,449 filed Jul. 30, 2012. Application Ser. No. 13/508,449 is a § 371 National Stage of PCT International Application No. PCT/IB2010/055083 filed Nov. 9, 2010. PCT/IB2010/055083 claims priority to IT Application No. MO2009A000269 filed Nov. 10, 2009. The entire contents of these applications are incorporated herein by reference.

BACKGROUND OF THE INVENTION

The invention relates to a cutting apparatus and method, in particular for cutting or engraving plastics or metal (for example aluminium or steel), more in particular to make a weakening line in caps made of plastics.

Specifically, but not exclusively, the invention can be used to produce caps made of plastics for closing containers, in particular for making the preferential weakening or fracturing line that is used to define a tamperproof device intended to indicate the first opening of the cap.

Making the preferential breaking line of a tamperproof ring in caps made of plastics by cutting apparatuses that comprise a carousel that has a series of movable spindles that are able to rotate around their axis is known. In use, the caps to be cut engage in the spindles and are thus rolled on a fixed sector that carries a blade that is suitably shaped according to the type of cut that it is desired to perform. The fixed sector can be positioned either outside the carousel that carries the spindles or inside the spindles.

One of the problems of the known apparatuses of this type is of the fact that the cutting blade is subject to wear during use and can accidentally splinter or break, with consequent deterioration in the quality of the caps produced, such that the correct operation of the tamperproof device is no longer ensured.

This problem is particularly relevant in the case of a machining process that occurs continuously and in line with other apparatuses.

Solving the above problem by means of periodical checking of the cutting quality on the caps produced and thus of the correct function of the tamperproof device is known, by removing and checking a sample at periodical intervals (for example every one or two hours). This solution nevertheless has the following drawback: if for example average production speed is 60,000 caps an hour and the sampling period is one hour, if insufficient quality is detected in the sample of caps all the 60,000 caps produced in the hour preceding the sampling have to be rejected because correct operation of the tamperproof device would not be guaranteed.

The prior art further includes U.S. Pat. No. 4,511,054, which discloses a method and an apparatus to control the quality of the weakening line made between the tamperproof ring and the 'skirt' portion of a cap made of plastics. U.S. Pat. No. 4,511,054 relates to the problem of improving and controlling the dimensional tolerances of the weakening lines that are made on caps made of plastics. The apparatus and the method shown in this document perform a check directly on each cap. In particular, an optical apparatus is provided comprising a light source and a detector. During the test, the light source is positioned inside a cap while the detector is positioned outside the cap. The cap is rotated around an axis thereof while a light beam generated by the light source traverses a cap cutting zone and intercepts the detector. Each uncut cap portion is detected through an interruption of the light beam. The optical apparatus is able to detect whether the cutting zones meet preset dimensional parameters.

The use of laser devices for controlling the positioning and possible damage to or wear of a cutting blade is also known, as is the use of laser devices for controlling the flatness of a disc blade.

European Patent No. EP 1 609 570 disclosed a system for controlling the cutting blade, particularly for shearing machines for cutting sheets of paper, plastics, etc. The system has the function of continuously controlling friction wear or overheating deformation of a disc or hand blade for cuffing the sheet material. The system enables the cutting operation to be stopped at the moment in which an operationally unacceptable blade condition is detected. Measuring sensors (not shown) are provided that detect the variations in the radius of the blade caused by wear. A device is also provided for measuring the planar deformation of the blade, including a distance sensor, for example a laser probe provided with a transmitter/emitter coupled with an optical detector/receiver.

German Patent No. DE 4 232 236 disclosed a device for detecting the contour of a tool, such as a knife, a drill, etc. without contact. This document discloses the use of a laser device to check the contour of a tool. The device includes a laser source configured for generating two laser beams, and a detector suitable for receiving the two laser beams. During operation, the laser beams strike the side surface of the tool and from the manner in which they are intercepted by the detector the contour of the tool is detected point by point in space. A device that is similar to the one that has just been discussed is also shown in U.S. Pat. No. 4,657,395 and Japanese patent No. JP 62006114.

Japanese patent publication No. JP 54109682 discloses a method and a device for automatically detecting possible damage to a blade, in which a laser beam emitted by a light projector hits the surface of the blade and is reflected at 45 degrees to the hit surface. The reflected beam may or may not be intercepted by the receiver, which produces a significant signal of the state of damage of the blade. Depending on this signal, the system is stopped or continues to operate.

U.S. Pat. No. 6,237,455 discloses a cutting machine relating to the woodworking industry, provided with knives and with a detecting device for inspecting the knives. In one embodiment (FIGS. 6 and 7) the machine includes an annular rotor that internally supports in a cantilevered manner several knives and through rotational motion drags the knives to cut the pieces of wood. Two sensors are provided that are arranged at opposite ends to the knives and monitor how much the knives project towards the longitudinal axis of the annular rotor. The sensors may be proximity sensors. The sensors are arranged in a stationary position while the knives are moved.

U.S. Pat. No. 6,576,531 discloses a method and an apparatus for detecting incorrect positioning of a disc blade. A distance sensor, for example of laser type, is provided, which measures a distance from the disc blade while the latter rotates by detecting the variation of this distance, which has to be contained within a given range for correct operation of the system.

Patent publication WO 2004/004993 shows a cutting apparatus.

SUMMARY OF THE INVENTION

One object of the invention is to provide a cutting apparatus in which good quality of the cuffing operation performed is assured.

Another object is to provide a cutting method in which the good quality of the cut operation is ensured.

One advantage is to make an apparatus and/or a cutting method available for making the weakening line in caps made of plastics with relatively high productivity.

Another advantage is to devise an apparatus and/or a cutting method for precisely making the weakening line in caps made of plastics.

A further advantage is to reduce the risk of rejects in the production of caps made of plastics provided with a tamperproof device.

The apparatus in subject may include a sensor configured for detecting the presence/integrity of the cutting edge of the cutting tool that makes the weakening line of the tamperproof device in caps made of plastics for closing containers.

The apparatus in subject may include a sensor that is set up for detecting at least one anomalous operating condition in the cutting tool and which is at least partially moved by a movable element with which the apparatus is equipped to give all the caps to be cut a corresponding advancing movement with respect to the cutting tool.

The aforesaid movable element may comprise a rotating carousel that carries a plurality of tools, which in turn rotate with respect to the carousel, each of which in use is operationally associated with a cap to rotate the cap about itself.

BRIEF DESCRIPTION OF THE DRAWINGS

The invention can be better understood and implemented with reference to the attached drawings that illustrate some non-limiting embodiments thereof.

DETAILED DESCRIPTION

Figure 1:
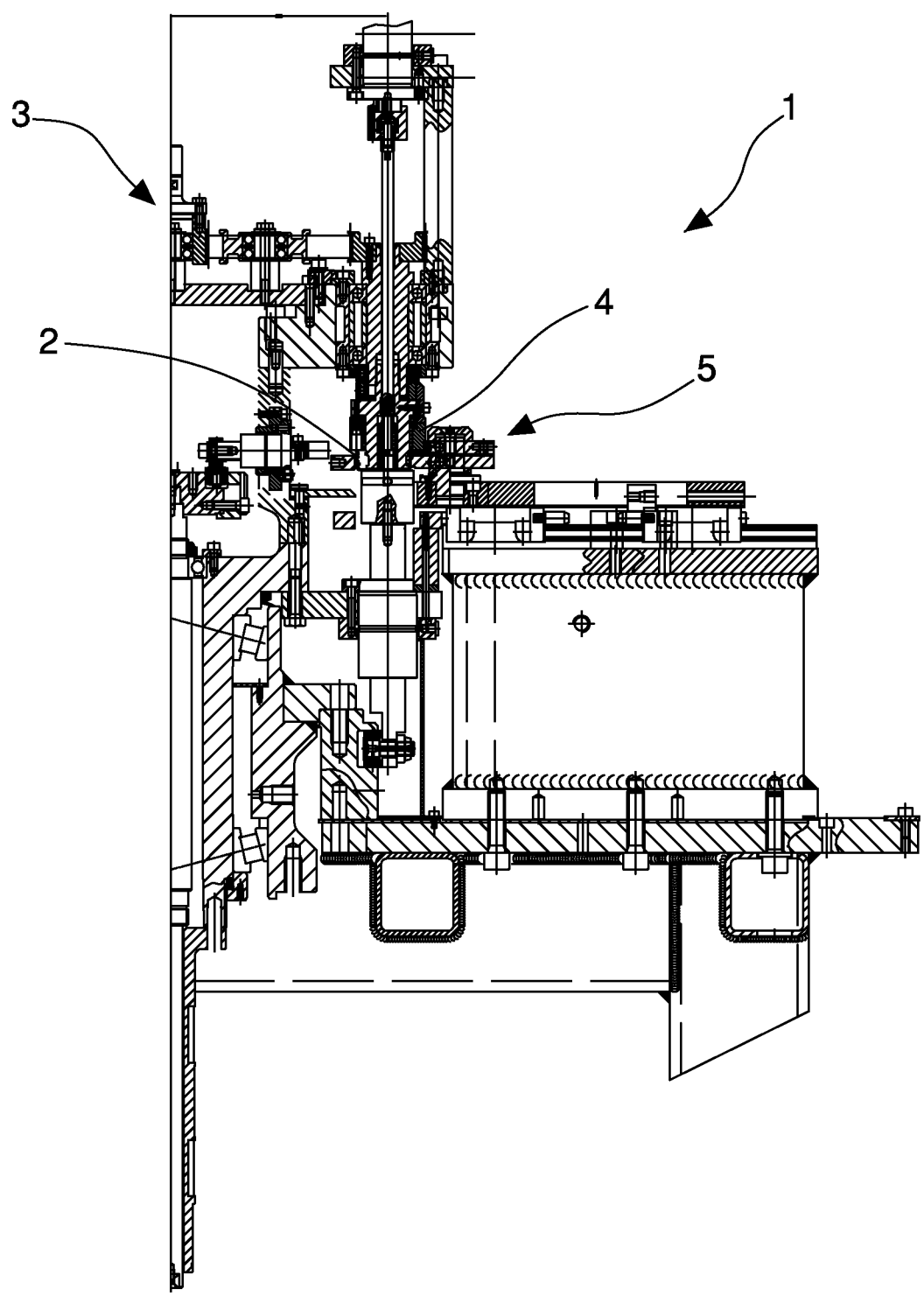
FIG. 1 is a section in a vertical elevation of a part of the apparatus.
Figure 2:
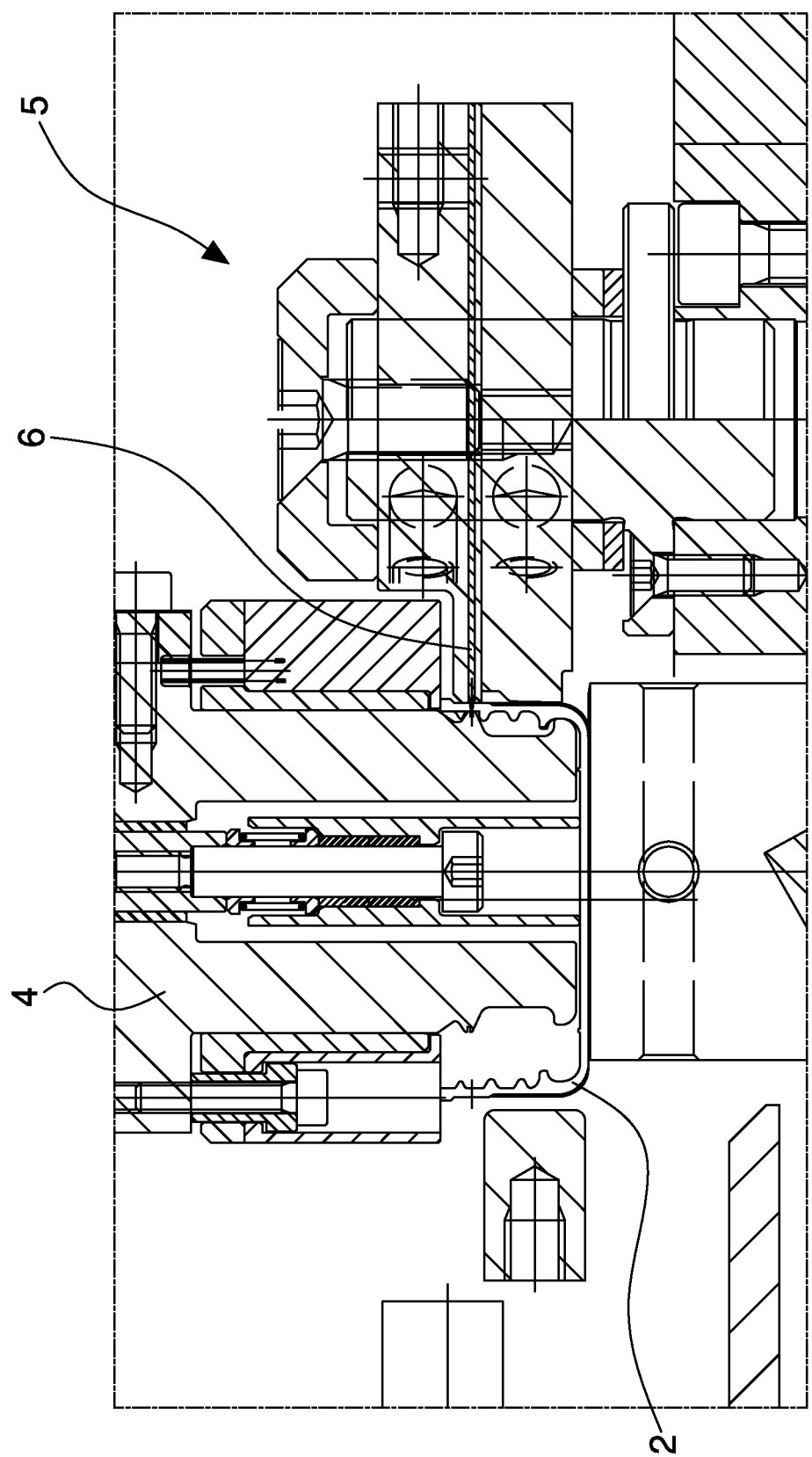
FIG. 2 is an enlarged detail of FIG. 1.
Figure 3:
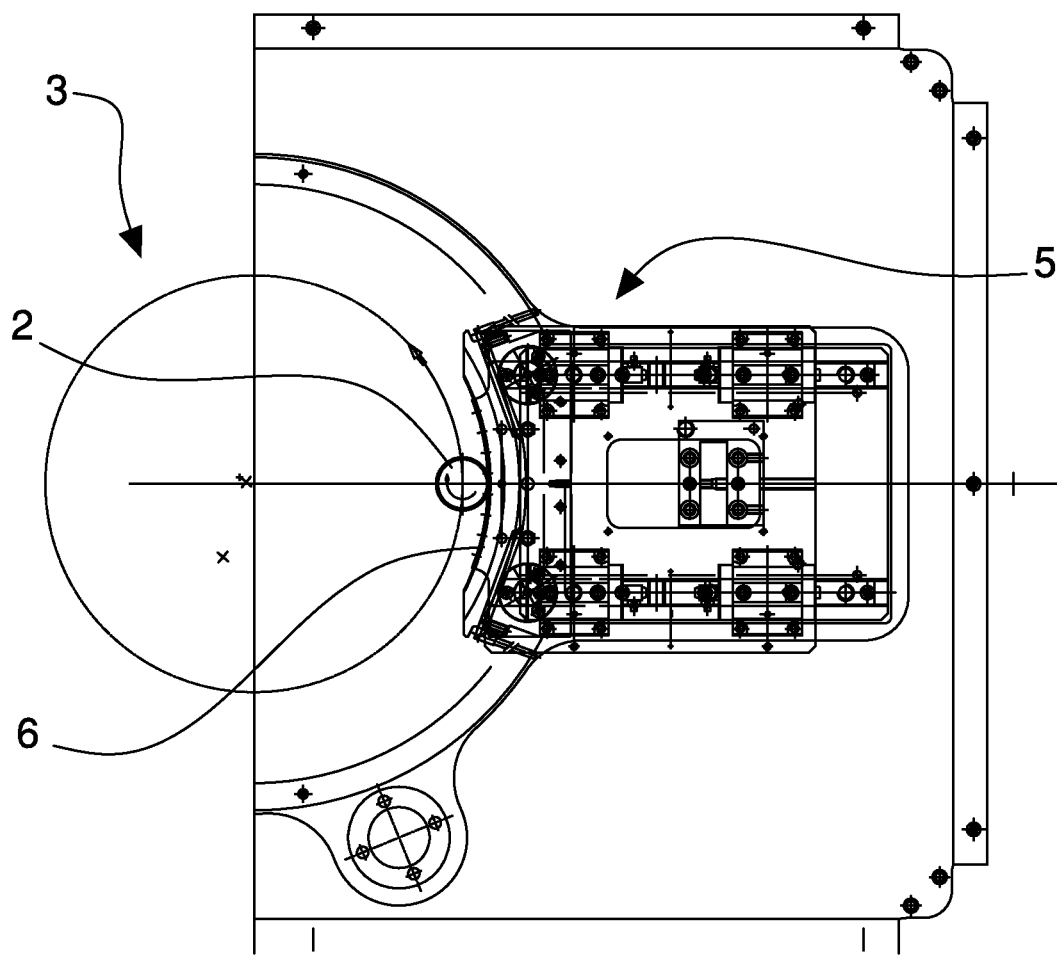
FIG. 3 is a top plan view of a part of the apparatus of FIG. 1.
Figure 4:
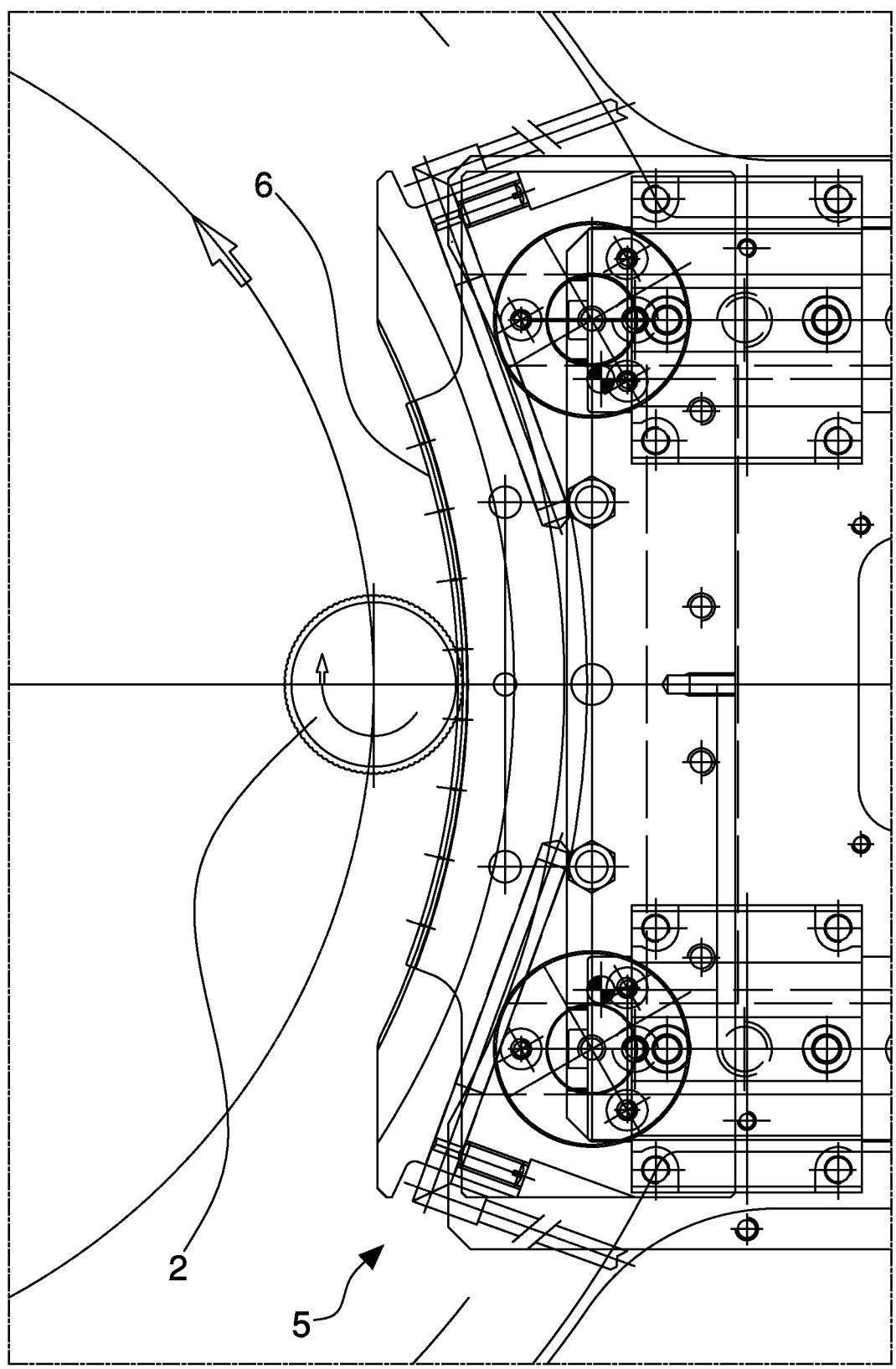
FIG. 4 is an enlarged detail of FIG. 3.
Figure 5:
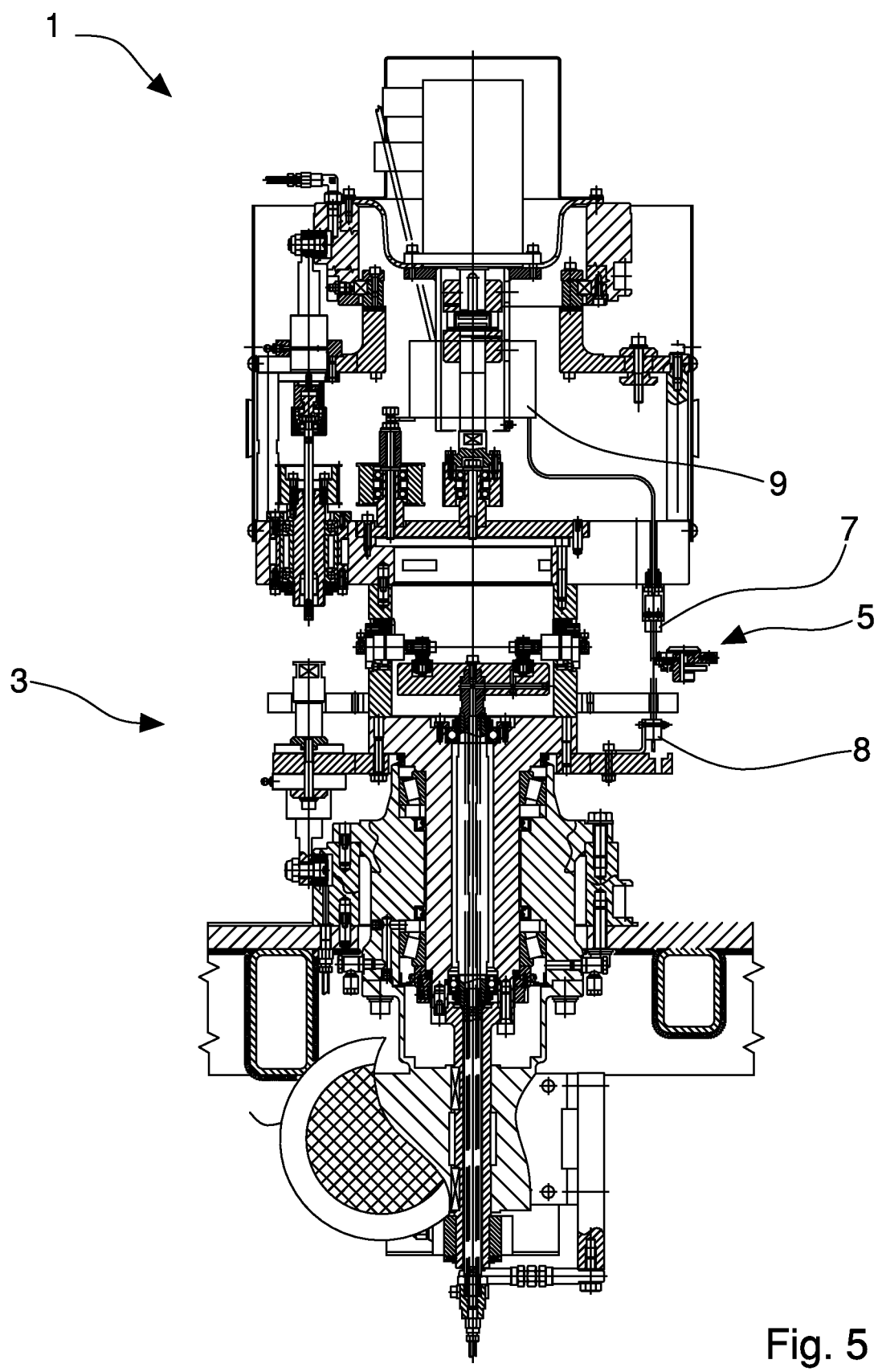
FIG. 5 is a section in vertical elevation of a part of the apparatus including the sensor for detecting faults on the cutting device.
Figure 6:
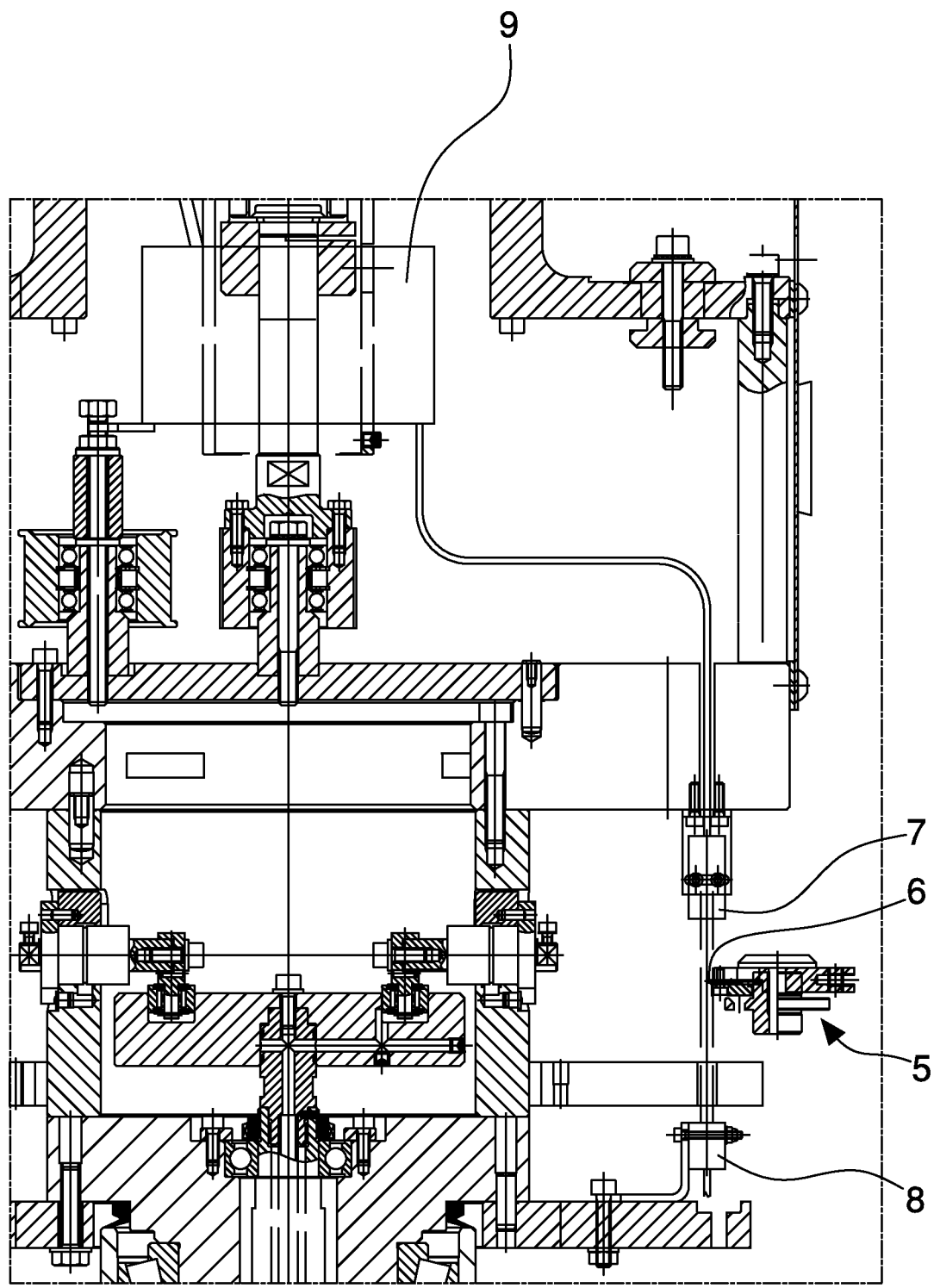
FIG. 6 is an enlarged detail of FIG. 5.
Figure 7:
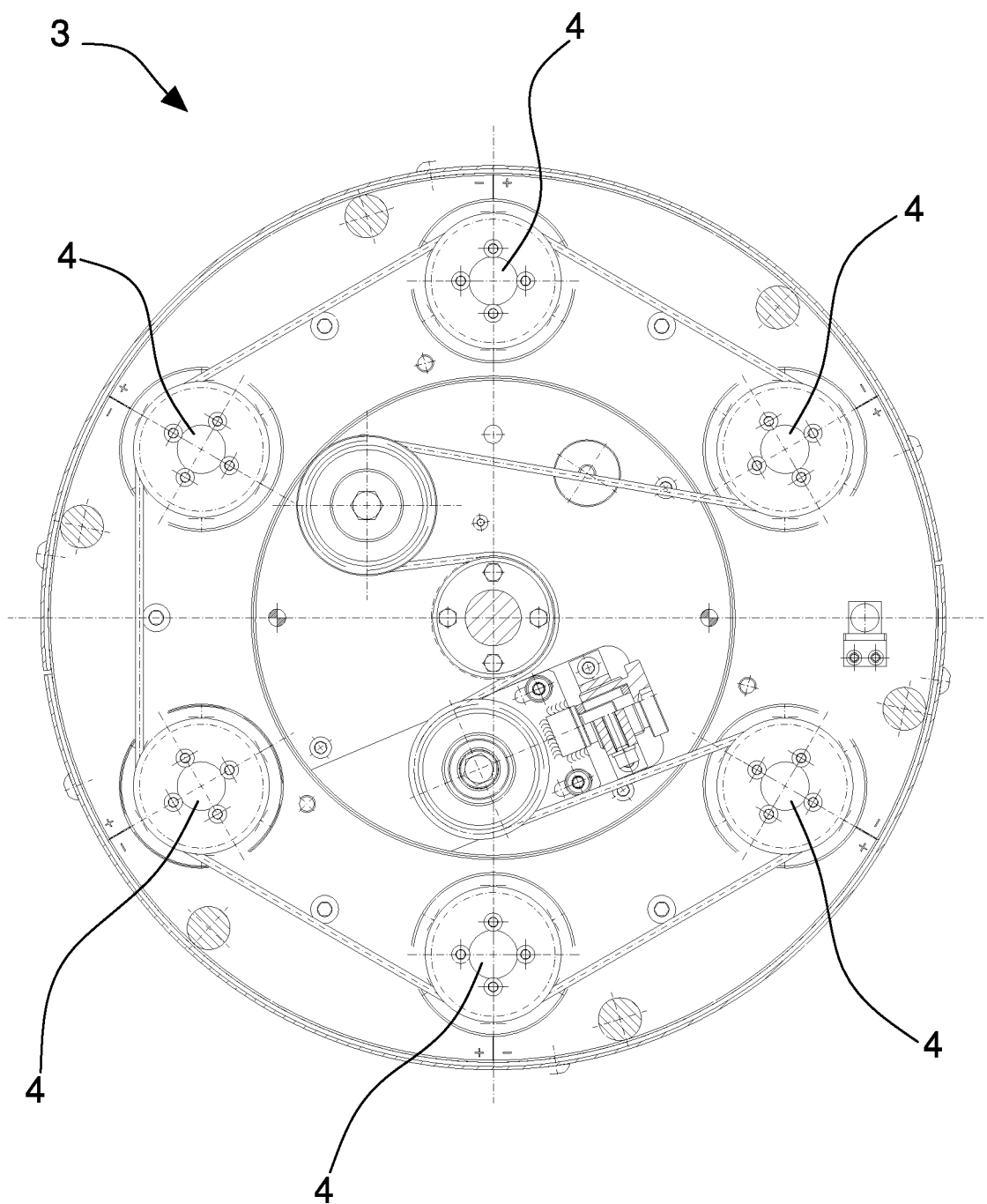
FIG. 7 is a top plan view of the apparatus in FIG. 1 showing the tools that rotate the caps to be cut.
Figure 8:
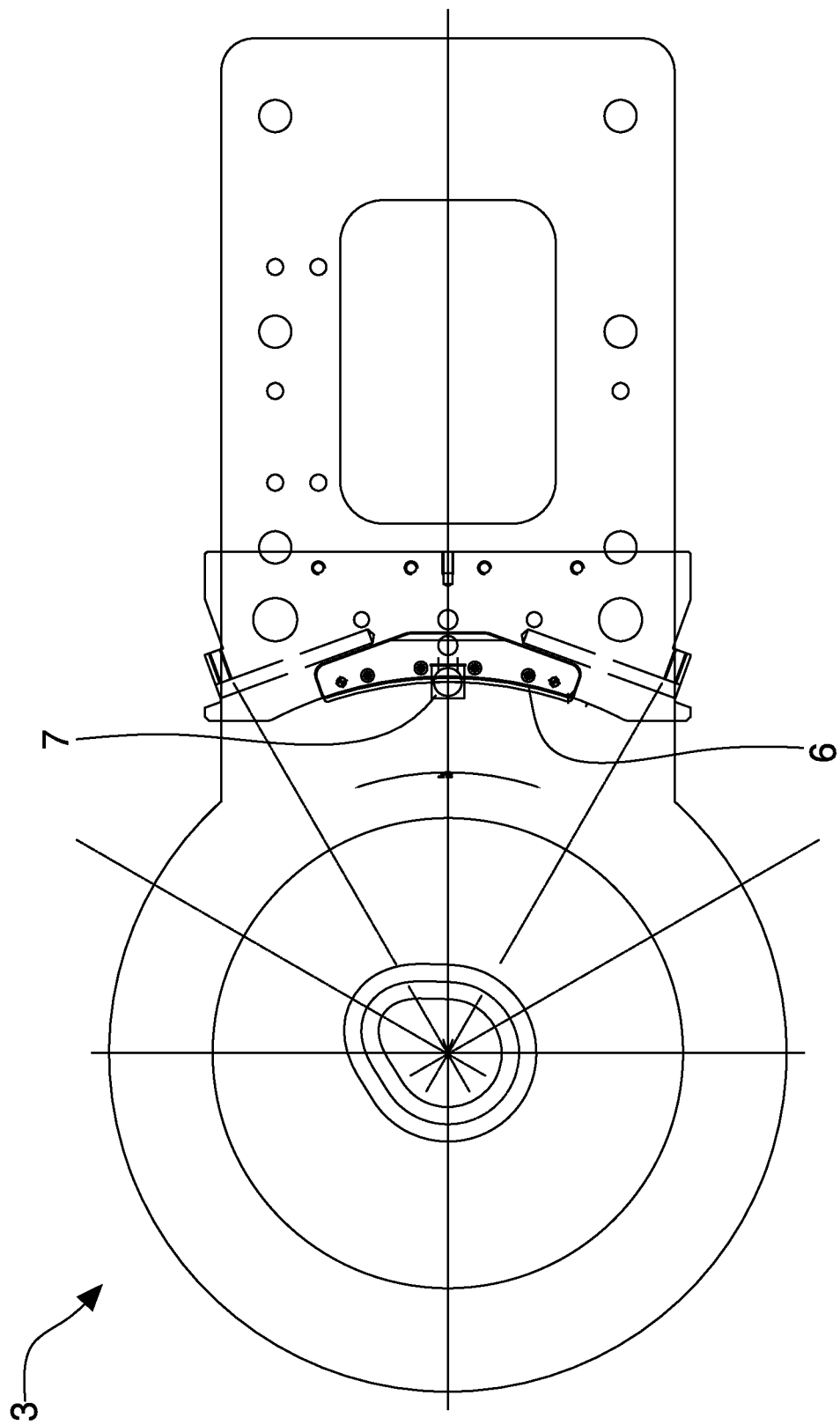
FIG. 8 is a top plan view of the apparatus in FIG. 1 showing the fixed parts of the cutting system.
Figure 9:
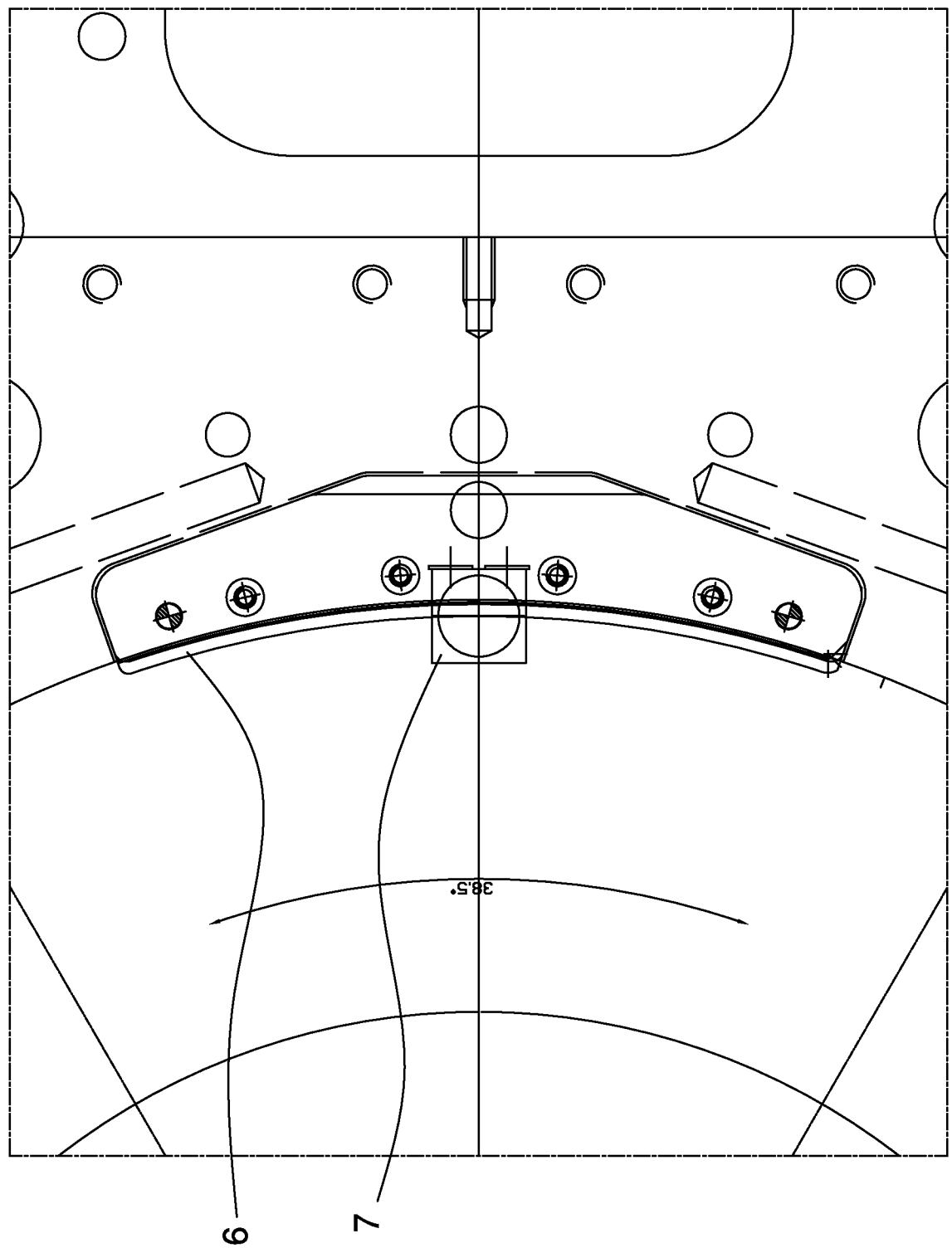
FIG. 9 is an enlarged detail of FIG. 8.

With reference to the aforesaid Figures, 1 shows overall a cutting apparatus, 2 a cap of plastics for closing containers, 3 a conveying carousel, 4 spindles for transmitting rotational motion to the caps being machined, 5 a cutting device operationally associated with the caps, 6 a blade of the aforesaid cutting device, 7 a signals emitter, 8 a signals receiver operationally associated with the aforesaid emitter, and 9 a rotating joint connected to the aforesaid emitter.

The cutting apparatus 1 is used to make a weakening line in a cap made of plastics to form a tamperproof device (tamperproof ring or band) that enables the prior opening of the cap to be recognized. In general, the weakening or facilitated fracturing line extends substantially circumferentially on an annular or skirt portion of the cap, such as to define a ring-shaped tamperproof device.

The cutting apparatus 1 can be inserted into a complex machining system where the caps may undergo a series of other machinings before and/or after the cutting operation.

The cap 2 includes a skirt portion that is the part that is subjected to cutting to make the weakening line. The cap 2 further includes a bottom portion that closes the skirt portion at a first end. The skirt portion can be threaded internally. The weakening line defines a tamperproof ring that is arranged at a second end of the skirt portion opposite the first end.

The carousel 3 is rotated around a vertical rotation axis. The carousel 3 defines a conveying system that removes the caps 2 from a removing zone, advances the caps in an orderly manner (one after the other) to a cutting zone, to then convey the cut caps to a release zone where it can operate a further conveying system that sends the caps for possible further machinings.

The carousel 3 defines a circular advancing path in a horizontal plane for the caps. It is possible to provide other conveying systems that are optionally able to define other advancing paths.

The carousel 3 has a plurality of spindles 4 that are distributed on the carousel angularly spaced apart from one another, for example equidistant. In the specific case, there are six spindles, but it is also possible to provide a number that is greater or less than six.

Each spindle 4 is provided with the possibility of rotating around a rotation axis thereof with respect to the carousel 3. The rotation axis of each spindle 4 can be, as in the specific case, vertical. The rotation axis of each spindle 4 can be, as in the specific case, parallel to the rotation axis of the carousel 3. The rotation axes of the spindles 4 can be, as in the specific case, parallel to one another.

The spindles 4 movement system is of known type and does not therefore require further explanations.

In use, as known, each spindle 4 is inserted inside a corresponding cap 2. The caps 2 can be arranged with the bottom portion facing downwards. In this case the spindle 4 enters the cap 2 from above.

It is possible to use other systems for transmitting cutting motion to the caps 2, for example configured for conveying the caps 2 with a different orientation thereof (for example with the bottom portion facing upwards, or oriented vertically, or obliquely, or with variable orientation along the path).

The cutting device 5 includes a supporting unit that retains in a working position, which in the specific case is fixed, the blade 6 that forms the weakening line on the various caps 2 conveyed by the spindle-carrying carousel.

The blade 6 can be substantially in the shape of a circular sector. The blade 6 can be provided with a blade with an arched shape. In particular, the blade 6 can be provided, as in the specific case, with a blade with substantially the shape of a circumference arc. The blade with an arched shape can be extended, as in the specific case, by an angle of approximately 38-39 degrees for example between 30 and 45 degrees. It is nevertheless possible to provide an angular extent that is less than 30 degrees or greater than 45 degrees.

The cutting device 5 is set up for operating along the advancing path of the caps 2. This advancing path is the one defined by the conveying device of the caps with which the apparatus is provided and which includes the carousel 3 that, as is seen, defines at least one portion of advancing path in the shape of a circumferential arc that substantially corresponds to the shape of the cutting edge. Each spindle 4 then defines a rotation motion of the corresponding cap about itself to enable the blade 6 to operate in a circumferential direction on the skirt portion of the cap for a desired angular size, if necessary, to obtain a weakening line extending 360° over an entire circumference. In use, each spindle 4 will force the corresponding cap to roll on the blade 6 so as to cut the cap at 360°.

The blade 6 may include a cutting edge that is continuous or configured to make a continuous weakening line. It is possible to provide a blade provided with a discontinuous cutting edge or which is configured to make a discontinuous weakening line, for example a line including a series of bridges intended for fracturing and which are interrupted by a series of windows.

The apparatus 1 is further provided with a sensor configured for detecting a fault (for example wear, shifting from the desired position, breakage or removal of parts, etc.) in the cutting device, in particular in the blade 6 of the device.

The sensor can be configured for detecting the presence or absence of the cutting edge along the entire or at least part of the extent of the cutting blade 6.

The sensor can include at least one presence sensor that is able to detect the presence or absence (or shift from a desired position) of at least one part of the cutting device 5, in particular the presence or absence (or the shift from a desired position) of an operating part of the cutting device, such as, for example, the presence or absence (or shift from a desired position) of at least one part of a cutting edge with which the cutting device 5 is provided.

The sensor can include a laser sensor. The sensor can also include an emitter 7 of signals and a corresponding receiver 8 of the signals emitted by the receiver 7. The sensor can further include a radiation emitting sensor (for example of optical type) that is set up in such a way that at least one part of the emitted radiation affects at least one part of the blade 6 of the cutting device 5.

The radiation emitting sensor (in the specific example of laser type) may have a measuring size between 1 mm and 15 min. The measuring size, which, as known, influences reading resolution, can be for example 5 mm. The measuring size may include the diameter of the circular radiation beams emitted.

The emitter 7 and/or the receiver 8 can be associated or applied, for example firmly mounted, to the conveying system that supplies to the caps 2 the advancing motion to the cutting device 5 and/or the cutting motion proper. The emitter 7 and/or the receiver 8 can be associated or applied, for example integrally mounted, on the carousel 3 that carries the spindles 4.

The receiver 8 can be positioned opposite the emitter 7 at a preset distance therefrom and remain in the same corresponding position in relation to the emitter 7 during movement of the conveying system of the caps 2. The position of the emitter 7 and of the receiver 3 will be able to enable the control (laser) radiation beam to at least partially reach the cutting blade 6.

The emitter 7 and the receiver 8 are arranged spaced apart from one another (for example along a vertical direction as in the illustrated example) in such a way that the blade 6 is interposed between the emitter 7 and the receiver 8 for at least a portion of the path travelled by the emitter 7 and by the receiver 8. The latter, i.e. rotated by the carousel 3, are arranged in such a manner that for a portion of this rotation the radiation beam affects the blade 6. In particular, the radiation beam moves in such a manner as to affect the entire length of the blade 6.

The sensor can then be connected to a monitoring and/or control unit that will process the received signal to detect the fault condition or correct operation of the apparatus.

The connection of the sensor with the monitoring and/or control unit can be an electric connection through a rotating joint 9, or a wireless connection (for example radio waves, or infrared waves, or laser), or yet another type of connection.

In use, the radiation beam emitted by the emitter 7 (and received by the opposite receiver 8) can meet the cutting device 5 at each revolution of the carousel 3.

The carousel 3 conveys the various caps 2 in an orderly manner (one after the other) to the cutting device 5 and further conveys the sensor (the emitter 7 and the receiver 8) to perform a rotational motion by periodically passing near the blade 6. The various caps 2 are further provided with a further rotating (cutting) motion about itself by the spindles 4.

It is possible to provide for the monitoring/control unit being able to activate the sensor (being able, in particular, to emit the radiation beam for reading the conditions of the blade 6) at least, or only, at the cutting blade 6, in particular when, during the rotation of the carousel 3, the emitter 7 passes in front of the blade 6 for the size of the arc (circumference) extent of the blade, i.e. in the specific case for an arc of 38°-39°.

In operation, at each, revolution of the carousel 3 the sensor (emitter 7 and receiver 8 cooperating together) will detect the presence of the cutting edge of the blade 6 and will indicate a fault condition (with possible automatic stop of the apparatus) if, for example, a portion of the cutting edge should be missing along the extent of the blade 6, or if, for example, the cutting edge were diminished with respect to an initial position. Information concerning an initial position can be stored by the monitoring/control unit in an initial operating step.

Precision in reading the condition of the cutting device 5 depends on various factors, including the stiffness of the apparatus overall and in particular of the apparatus parts on which the sensor is applied, and the absence or the size of the clearance between the reciprocally moving parts (in particular between the elements that rotate), etc.

The fact of having at least a part of the sensor associated with at least one apparatus part that is substantially integral with the caps (i.e. a movable apparatus part that moves the caps), enables the presence of an anomalous situation (incorrect cutting) to be detected that is due, for example, to an undesired or uncontrolled change to the path of the caps 2 conveyed by the carousel 3. In fact, taking as an example the specific case illustrated here, as the sensor is at least in part integral in motion with the caps, the variation of the trajectory of the caps will also entail a variation in the trajectory of the sensor and thus the report of a shift (both of the sensor and of the caps) relative with respect to the cutting device.

Thus, the fact of having at least one part of the sensor associated with at least one apparatus part substantially integral with the caps (i.e. a movable apparatus part that moves the caps), ensures that a fault situation will be reported due to even a slight shift in the mutual positioning between the apparatus parts that are in reciprocal movement (such as, for example, the part that is substantially integral with the cutting device and the part that is substantially integral with the caps), with respect to a nominal or reference positioning.

Figure 10:
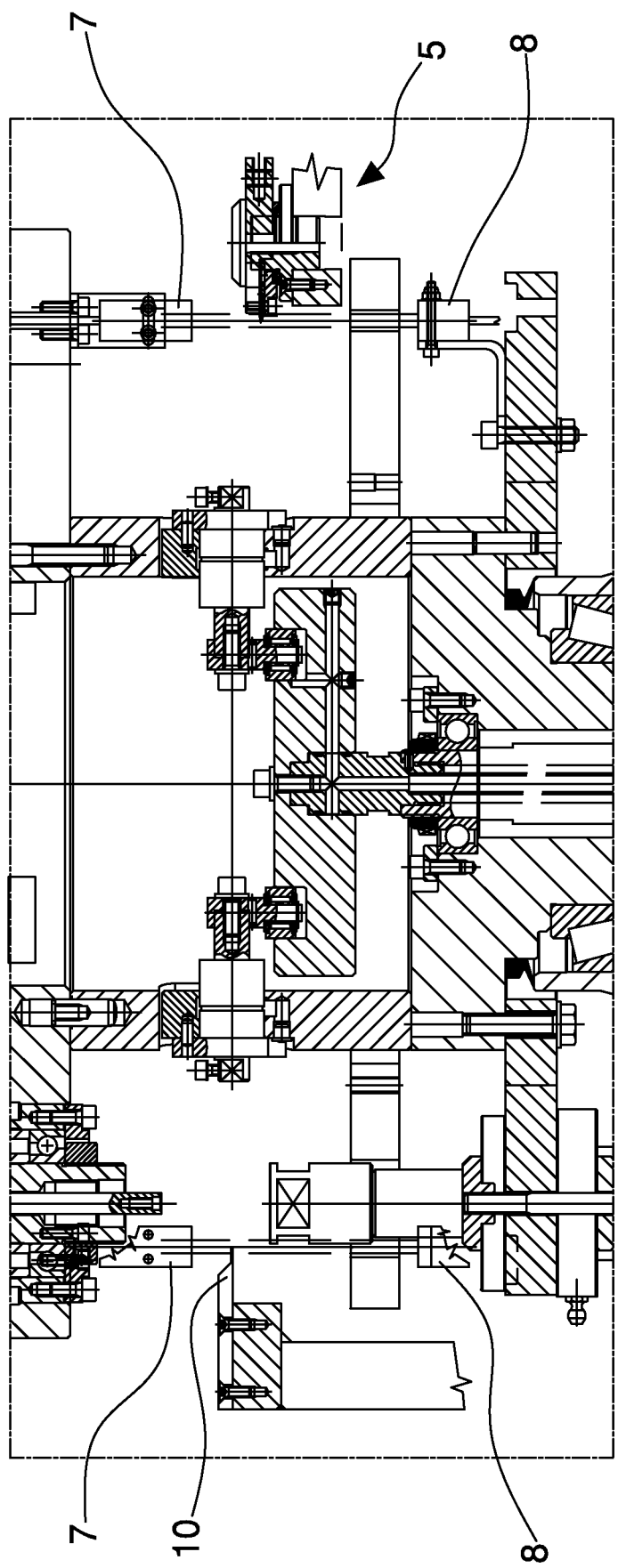
FIG. 10 is a detail of another embodiment of the apparatus.

In the embodiment illustrated in FIG. 10, the apparatus substantially conforms to that of FIGS. 1 to 9. The apparatus in FIG. 10 has a reference element, indicated by 10, which is set up in a zone of the path along which the sensor (emitter 7 and receiver 8 unit) travels. The reference element 10 can be fixed. The reference element 10 can be arranged in such a way as to be integral, or stationary, with respect to the cutting device 5 in order to simulate the presence thereof in another portion of the advancing path of the conveying system (carousel 3) of the caps and of the sensor (or sensors). The elements in FIG. 10 that are similar to those in FIGS. 1 to 9 have been indicated by the same numbering.

The reference element 10 can be configured in such a manner as to reproduce or at least simulate the presence of a cutting device (in particular of a cutting blade) that is effectively operational like the cutting device 5. The reference element 10 may have, for example, a conformation that is similar to that of the blade 6. The reference element 10 may include, for example, a body that reproduces at least partially the configuration of the blade 6 which is electively operational and which is arranged at the same radial distance that the blade 6 has from the rotation axis of the carousel 3.

The reference element 10 can be situated in a zone of the path travelled by the sensor that is far from the actual cutting zone (where the blade 6 is present). The reference element 10 can be situated, for example, in a non-operating zone where cutting of the caps is not provided and where the passage of the caps may not be provided for either. The reference element 10 can be situated, for example, in a zone of the circular path of the sensor that is diametrically opposite the operating zone where the cutting device 5 operates.

In use, the sensor (emitter 7 and receiver 8 unit), which is active on the cutting device 5, is also activated in a path zone where the reference element 10 is present. Activation and the manner of operation of the sensor (such as the corresponding arrangement of the various parts of the sensor with respect to the object to be detected on which the sensor operates) occur in a similar manner to what was disclosed before. The sensor, being operationally associated also with the reference element 10, can provide an indirect indication of possible faults in the operation of the apparatus, for example in the cutting operation. The sensor may, for example, detect an undesired movement of the position of the conveying system (carousel) of the caps such as to cause an incorrect variation in the advancing path of the caps. The reference element 10 can also be used to check correct operation of the sensor.

The sensor is configured to detect the position of the reference element 10 and to send a corresponding signal to the monitoring and/or control unit. The latter can compare the signal received, indicating the actual position of the reference element (position with respect to the sensor), with a signal indicating the desired preset position. If the shift from the desired position exceeds a set threshold, the monitoring and control unit will intervene appropriately (by reporting and/or stopping the apparatus).

Detection of shift from a normal situation (for example shift beyond a given threshold) indicates incorrect operation of the sensor and/or a fault in the conveying system (of the sensor and of the caps).

In one embodiment, it is possible to activate the sensor only on the reference element 10, in this case the sensor might not be configured for operating on the cutting device 5.

It is possible to configure the monitoring and/or control unit in such a manner as to program detecting of the sensor only in set zones of the path of the sensor in such a way that, in the case of a discontinuous blade, it is possible to detect the presence of a cutting edge provided with preset interruptions (notches).

In other embodiments, it is possible to provide for at least one part of the cutting motion being supplied also, or only, to the cutting device (blade) rather than, as in the specific case, only to the caps. Also in this case the sensor can be associated (in part) with the cutting device and/or (in part) with the caps.

In other embodiments, it is possible to set up the cutting device in such a manner that it operates inside the rotational or at least curved path of the caps, rather than outside as in the illustrated example. In still other embodiments it is possible to provide for at least one part of the path of the caps in the cutting zone being substantially rectilinear.

In other embodiments, it is possible to associate the sensor operationally only with the cutting device, without thus applying at least a part of the sensor to the apparatus part that carries the caps.

In other embodiments, it is possible to set up a plurality of sensors. For example, two or more radiation emitter/receiver units arranged spaced apart from one another can be associated with the movable part of the cutting apparatus. The various sensors could, for example, be located on a carousel which rotates on a same circumference which is co-axial with the rotation axis of the carousel and be angularly equidistant from one another.

The apparatus disclosed above may thus include a control system for controlling the blade that forms the weakening line in caps made of plastics. This control system may include in turn at least one sensor that is suitable for detecting the presence of the cutting edge of the blade. The sensor can be set up to operate with a frequency that depends on the frequency with which the blade performs the cut on the caps. In particular, the sensor can be set up to operate at each revolution that a rotating carousel performs that conveys the caps and confers thereto at least a part of the cutting motion.

As in the specific illustrated example, the maximum number of caps that can be produced with an incorrect cut (i.e. the maximum number of rejected caps) cannot exceed the number of caps carried simultaneously by the conveying carousel, and cannot exceed the number of spindles 4 contained in the carousel 3 (a number that is normally the same as six, twelve, or twenty-four).

As mentioned, it is possible to also set up two or more control sensors for controlling correct operation of the apparatus. In particular, it is possible to set up a sensor or group of sensors (for example emitter and receiver) for each spindle, i,e. a number of sensors that is the same as the number of spindles.

All the various embodiments disclosed above can be combined together in any possible combination of elements.

The invention claimed is:

1. A cutting apparatus, comprising
   (a) a cutting device configured for forming at least one weakening zone on each cap of a plurality of caps, said cutting device including a fixed blade having a cutting edge configured as a circumferential arc;
   (b) a conveying device arranged adjacent to said cutting device for supplying said cutting device with said plurality of caps, said conveying device including a carousel which carries said plurality of caps and which rotates around a rotation axis that is coaxial with said circumferential arc, said carousel comprising a plurality of spindles on a peripheral zone thereof, each spindle of said plurality of spindles rotating in turn with respect to said carousel and being configured to engage with each cap to rotate each cap, whereby said carousel conveys said plurality of caps one after the other to said cutting device and each cap is provided with a further cutting motion by a respective one of said plurality of spindles; and (c) at least one sensor to detect at least one faulty operating condition of said cutting device, at least a portion of said at least one sensor being mounted on said carousel, said at least a portion of said at least one sensor comprising at least one emitter of signals and at least one receiver of signals each cooperating with the other, said at least a portion of said at least one sensor being arranged adjacent to and out of contact with said cutting device when said at least a portion of said sensor is in an operating condition in which at least a part of said blade is interposed between said at least one emitter and said at least one receiver, said at least one sensor and said cutting device being separate components, said at least a portion of said at least one sensor being movable along a closed-loop path and being periodically operable with respect to said cutting edge, said at least one emitter and said at least one receiver being carried by said carousel, said carousel conveying said at least one emitter and said at least one receiver to perform a rotational motion by periodically passing near said blade, wherein a radiation beam emitted by said at least one emitter meets said cutting device at each revolution of said carousel, said radiation beam being emitted for reading the conditions of said blade only when, during the rotation of said carousel, said at least one emitter passes in front of said blade for the arc extent of said cutting edge, said at least one sensor being able to detect an anomalous situation that is due to an undesired or uncontrolled change to the path of said plurality of caps conveyed by said carousel as said at least a portion of said at least one sensor is at least in part integral in motion with said plurality of caps, whereby a variation of a trajectory of said plurality of caps will entail a variation in a trajectory of said at least a portion of said at least one sensor and thus a shift of said at least a portion of said at least one sensor relative with respect to said cutting device.

2. A cutting apparatus according to claim 1, wherein said at least one sensor is configured to detect a position of at least a portion of said cutting device to determine a deviation from a desired relative position of said cutting device portion with respect to said carousel.

3. A cutting apparatus according to claim 2, and further comprising a reference element arranged in a preset position along an advancing path of said carousel, said at least one sensor detecting a position of at least a portion of said reference element to determine a deviation from a desired relative position of said reference element portion with respect to said carousel, said reference element comprising a body that reproduces at least partially the configuration of said blade which is effectively operational and which is arranged at the same radial distance of said blade from said rotation axis of said carousel.

4. A method for cutting caps, comprising the steps of
(a) supplying a plurality of caps to a cutting device that includes a fixed blade having a cutting edge configured as a circumferential arc;
(b) forming at least a weakening zone on each cap of the plurality of caps with said cutting device;
(c) detecting with a sensor whether said cutting device has a faulty operating condition, said detecting step including detecting at least one of the presence, absence, and deviation from a desired position of at least a portion of said cutting edge; and
(d) providing a carousel that carries said plurality of caps and at least a portion of said sensor to said cutting device, said at least a portion of said sensor carried by said carousel including at least an emitter of signals and at least a receiver of signals each cooperating with the other, said at least a portion of said sensor being arranged adjacent to and out of contact with said cutting device when said at least a portion of said sensor is in an operating condition in which at least a part of said blade is interposed between said emitter and said receiver, said sensor and said cutting device being separate components, said at least a portion of said sensor being movable along a closed-loop path and being periodically operational with respect to said cutting edge, said carousel rotating around a rotation axis coaxial with said circumferential arc, said carousel comprising a plurality of spindles on a peripheral zone thereof, each spindle of said plurality of spindles rotating in turn with respect to said carousel and being configured to engage with a cap of said plurality of caps to rotate the cap, whereby said carousel conveys said plurality of caps one after the other to said cutting device and each cap of said plurality of caps is provided with a further rotating cutting motion by a respective one of said plurality of spindles, wherein a radiation beam emitted by said emitter meets said cutting device at each revolution of said carousel, said radiation beam being emitted for reading the conditions of said blade only when, during the rotation of said carousel, said sensor passes in front of said blade for the arc extent of said cutting edge, said sensor being able to detect an anomalous situation that is due to an undesired or uncontrolled change to the path of said plurality of caps conveyed by said at carousel as said at least a portion of said sensor is at least in part integral in motion with said plurality of caps, whereby a variation of a trajectory of said plurality of caps will entail a variation in a trajectory of said at least a portion of said sensor and thus a shift of said at least a portion of said sensor relative with respect to said cutting device.

5. A method according to claim 4, wherein said detecting step further comprises emitting radiation that at least partially affects said cutting device.

6. A method according to claim 4, wherein said at least a portion of said sensor periodically faces at least a portion of said cutting device, said movable at least a portion of sensor being periodically activated when it faces said at least a portion of said cutting device.

* * * * *